(12) United States Patent
Baldwin

(10) Patent No.: US 9,350,918 B1
(45) Date of Patent: May 24, 2016

(54) GESTURE CONTROL FOR MANAGING AN IMAGE VIEW DISPLAY

(71) Applicant: Amazon Technologies, Inc., Reno, NV (US)

(72) Inventor: Leo Benedict Baldwin, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 246 days.

(21) Appl. No.: 13/672,573

(22) Filed: Nov. 8, 2012

(51) Int. Cl.
*H04N 5/232* (2006.01)

(52) U.S. Cl.
CPC ................... *H04N 5/23296* (2013.01)

(58) Field of Classification Search
CPC ............. H04N 5/23293; G09G 2340/045
USPC ....................................... 348/333.12
See application file for complete search history.

(56) References Cited

U.S. PATENT DOCUMENTS

| | | | | |
|---|---|---|---|---|
| 2006/0044399 | A1* | 3/2006 | Fredlund et al. | 348/207.99 |
| 2009/0088204 | A1* | 4/2009 | Culbert et al. | 455/556.1 |
| 2009/0164896 | A1* | 6/2009 | Thorn | 715/700 |
| 2012/0287163 | A1* | 11/2012 | Djavaherian | 345/667 |

* cited by examiner

*Primary Examiner* — Christopher K Peterson
(74) *Attorney, Agent, or Firm* — Polsinelli LLP

(57) ABSTRACT

Approaches are described for managing an image displayed on a computing device. An image of an object is displayed on an interface of the device. An activation movement performed by a user (such as a forward and backward motion) can cause the device to enable an image view control mode (such as a zoom control mode) that can be used to adjust a portion of the image being displayed on the interface. The activation movement can also be used to set a detection range, where a movement of the device within the range can cause the device to adjust the displayed image based on the image view control mode. Thereafter, in response to a motion being detected (such as moving the device towards the object), the device can adjust a portion of the image being displayed on the interface, such as displaying a "zoomed in" portion of the image.

24 Claims, 9 Drawing Sheets

GESTURE CONTROL FOR MANAGING AN IMAGE VIEW DISPLAY

BACKGROUND

As computing devices offer increasing processing capacity and functionality, users are able to operate these devices in an expanding variety of ways. For example, cameras on mobile devices are capable of capturing high resolution images and delivering an image scaled or windowed to a modest resolution for further use by the user. In some instances, however, there can be an issue of how to control features that modify the image being captured, such as a digital zoom feature. As such, a variety of methods to enable and/or control these features have been offered on these devices, such as virtual buttons on the screen of the computing devices or re-purposed physical buttons. As technology evolves and as the features offered on computing devices expand, the way in which users interact and control these devices is changing.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for managing the capture and/or display of one or more images, or video, via an electronic device. In particular, various embodiments enable a computing device (e.g., a mobile phone) or other portable computing device to detect a motion of the computing device, or other user motion, in a particular direction or along a particular pattern in order to adjust, in response to the detected motion, a portion of an image being captured and/or displayed on the computing device.

For example, in accordance with various embodiments, an image of an object can be displayed on an interface or other display element of a computing device, where the image can be captured using one or more camera or other sensor(s) of the computing device. An activation movement, or other action or gesture being performed by a user (such as a forward and backward motion of the device relative to a position of the user), can be detected. The activation movement can cause the device to enable an image view control mode or other such mode that can be used to adjust or otherwise modify a portion of the image being displayed on the interface. The activation movement can also be used to set a detection range, where a movement of the device relative to the user within the range can cause the device to adjust the displayed image by a corresponding amount, as may be determined based at least in part on the image view control mode. Thereafter, in response to a motion (such as moving the device closer to the object) being detected relative to the user, the device can adjust a portion of the image being displayed on the interface, such as displaying a "zoomed in" portion of the image, which can be accomplished using an optical zoom and/or digital zoom as known for imaging applications. The detected motion is performed at least within the detection range, and while the image view control mode is enabled.

Various other functions and advantages are described and suggested below as may be provided in accordance with the various embodiments.

Figure 1:
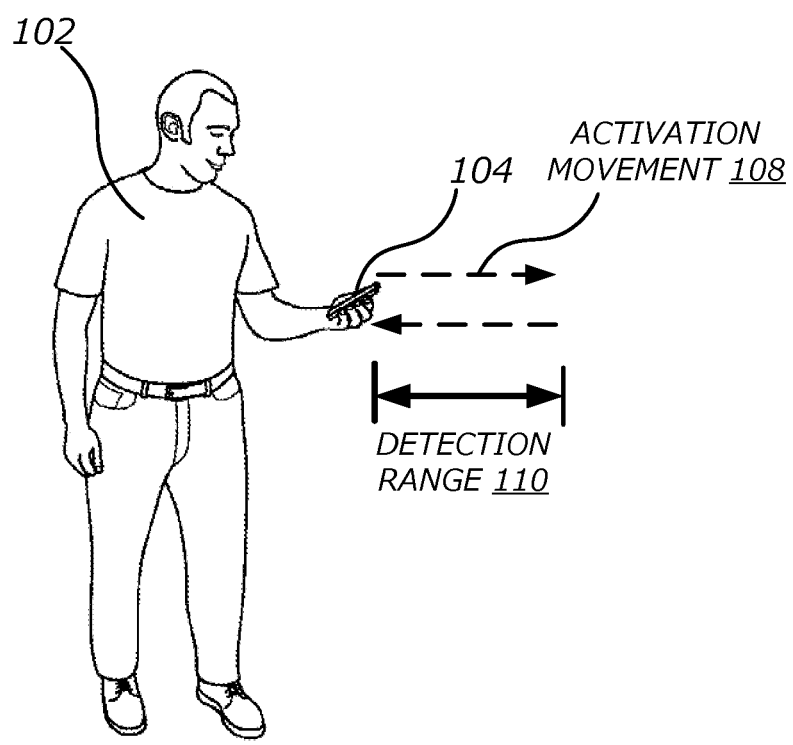
FIG. 1 illustrates an example implementation where a user is performing an activation movement that enables an image control mode and sets a detection range, in accordance with an embodiment.

FIG. 1 illustrates an example implementation where a user is performing an activation movement that enables an image control mode and sets a detection range, in accordance with an embodiment. As shown in FIG. 1, a user 102 is holding a computing device 104 (such as a mobile phone or other portable computing device), where the device can include one or more cameras (such as a front and rear facing camera) and an interface or other display element that can display an image or video of the current/active field of view being captured by the camera. It should be noted that the image is not a snapshot of the current/active field of view being captured by the camera; rather, the image is the current (or live) rendering of what the camera is being pointed at.

In this example, using a conventional approach, if the user wants to activate an image view control mode such as a zoom control mode that enables the device to "zoom in" and "zoom out" of the image displayed on the device, the user would typically interact with the device by selecting an icon or other selectable element such as a slider bar on the interface on the device to enable a desired image view control mode. Alternatively, after capturing an image, the camera and/or user can use photo editing software to crop or otherwise modify the image to digitally "zoom in" on a portion of the image. Accordingly, approaches in accordance with various embodiments allow a user to perform an activation movement relative to the user to enable an image view control mode. Thereafter, the user can move the device relative to the user to cause the interface to zoom or otherwise adjust based on the enabled image view control mode. In this way, the movement of the device can be interpreted by the device to cause the device to perform the enabled image view control mode, as opposed to the user implementing the image view control mode in another way such as through a touch input or other input method.

For example, as shown in FIG. 1, an activation movement 108 can be performed by the user 102, where in this example the activation movement 108 is a forward and backward motion of the device 104 relative to at least one position of the user. The activation movement can be performed upon activating the camera on the device, for example, where a sensor such as an accelerometer, inertial sensor, front-facing camera, or other such sensor of the device detects this initial motion. It should be noted that although the example shown in this figure illustrates a forward and backward motion used as an activation movement, the various embodiments described herein are not limited to this particular activation movement. Various alternative activation movements can be used within the scope of the embodiments described herein, as will be evident to one or ordinary skill in the art, such as a lateral movement, a shaking movement, moving the device away from the user, or any other movement.

In accordance with various embodiments, the activation movement can be detected in a number of ways. For example, a computing device can include a front facing camera (or other front-facing sensor such as an infrared proximity sensor), face-recognition software, and face-tracking software that can be used to detect an activation movement of the device performed relative to a user of the device. In one instance, the front-facing camera can be used to capture an image of the user's face, and the face-recognition software can be used by the device to determine a facial feature of the user, such as the user's eyes. Based on this determination, the device can determine a relative size of the facial feature, such as the distance between the user's eyes, and the distance between the user's eyes can be used to determine a measure of distance using techniques of photogrammetry, where the measure of distance is the distance between the detected facial feature and the device. As the user performs the activation movement, such as a forward and/or a backward movement of the device, the device can use the face-tracking software to track the user's face to determine a range of the forward and/or the backward movement. This range can be calibrated each time the activation movement is performed, and can be used to set a detection range in which the image view control is operable.

In accordance with an embodiment, two or more cameras, face-recognition software, and face-tracking software can be used to detect an activation movement of a device performed relative to a user of the device. In this instance, two cameras are operating simultaneously (where the camera capture is synched between the two cameras), and the face-detection and face-tracking software is used to determine a distance to the head of the user (or to some feature of the head, such as the eyes), where the distance is determined by triangulating the features between the two cameras using stereopsis. Thereafter, as the user performs the activation movement, such as a forward and/or a backward movement of the device, the device can determine a range of the forward and/or backward movement, and this range can be a range in which the image view control is operable. This approach advantageously provides for a higher resolution and lower-noise signal for the range, and is independent of the user (such as the distance between the user's eyes or other measurement of the user), and is instead dependent on a known distance between the two cameras.

In accordance with an embodiment, the techniques described with respect to the photogrammetry and stereopsis can be combined to detect an activation movement of a device performed relative to a user of the device. In this way, using both techniques simultaneously can provide for a more robust method to detect an activation movement, such as against events like the occasional occlusion of one of the two cameras as by a thumb or other object. It should be noted that various alternative methods can be used to detect or otherwise determine an activation movement can be used within the scope of the embodiments described herein, as will be evident to one or ordinary skill in the art, such as using a computing device having infrared cameras (or other sensors) to lock or otherwise detect a facial feature of a user; determine that the device is in a forward or backward motion; and determine a relative distance or range of the motion as a function of distance between the targeted facial feature and the computing device.

In accordance with an embodiment, the activation movement can cause the device 104 to enable an image view control mode, such as a zoom control mode, where subsequent movements of the device towards or away from the user, or other user motions, can cause the device to control zooming (digital or optical) of a rear-facing camera. This allows a portion of the image displayed on the interface of the device to be adjusted such that moving the device towards (and hence away from the user) an object magnifies (i.e., creates a narrower field of view or "zooms in") the image displayed on the interface and moving the device away from the object (and hence closer to the user) decreases the magnification (i.e., creates a wider field of view or "zooms out") and causes the image displayed on the device to appear smaller.

In accordance with an embodiment, the activation movement can cause the device to enable other image view control modes, such as a brightness mode that can be used to change the relative lightness of the image, a contrast mode that can be used to change the difference between the darkest and lightest areas of a image, or any other image control mode that can be used to manipulate, enhance or otherwise adjust the image by moving the device relative to the user.

Additionally, in accordance with an embodiment, depressing a button (such as a physical button, volume button, etc.) on the device can be used cause the device to activate an image control view mode, such as a zoom control mode. Thereafter, moving the device while the button is depressed can cause the device to zoom or otherwise adjust the image displayed on the device. Additionally or alternatively, depressing the button can lock focus and exposure, and in accordance with an embodiment, releasing the button can cause the device to take a picture.

The activation movement can also be used to calibrate or otherwise set a detection range 110, where the detection range is a range of space or distance relative to the user 102 in which the image view control mode is operable. For example, in the instance where the activation movement (such as a forward and backward motion) enables a zoom control mode, the activation movement can be used to calibrate how close is "zoomed fully wide angle" and how far away is "zoomed fully telephoto" or otherwise fully zoomed in. That is, the start position of the device before the forward motion of the activation movement and the return position of the device before the backward motion of the activation movement can be used to set the detection range 110, which then can be mapped to the zoom range (optical and/or digital) of the device. Thereafter, certain motion of the device detected within the detection range can cause the device to modify the image displayed on the interface based on the image view control mode.

For example, in the situation where a user "zooms in", the user moves the device towards the object, and the device modifies the image displayed on the interface by, e.g., subsampling and cropping the image up to a max crop factor, where the max crop factor can be tailored to the display of the device. For example, if the display of the device is 1MP, then the device would crop the image one-to-one. In the situation where a user "zooms out", the user moves the devices away from the object and towards the user, which causes the device to modify the image displayed on the interface by, e.g., displaying the entire object by using all the available pixels. Accordingly, in accordance with various embodiments, the device can perform any combination of cropping and subsampling to produce the feel of smooth optical zooming by manipulating pixels.

Alternatively, in accordance with an embodiment, the detection range can be set based on characteristics of the user, such as the age of the user. It should be noted that in some embodiments the image view control mode can be operable outside the detection range, on the boundary of the detection range, or in some portion of the detection range.

Figure 2A:
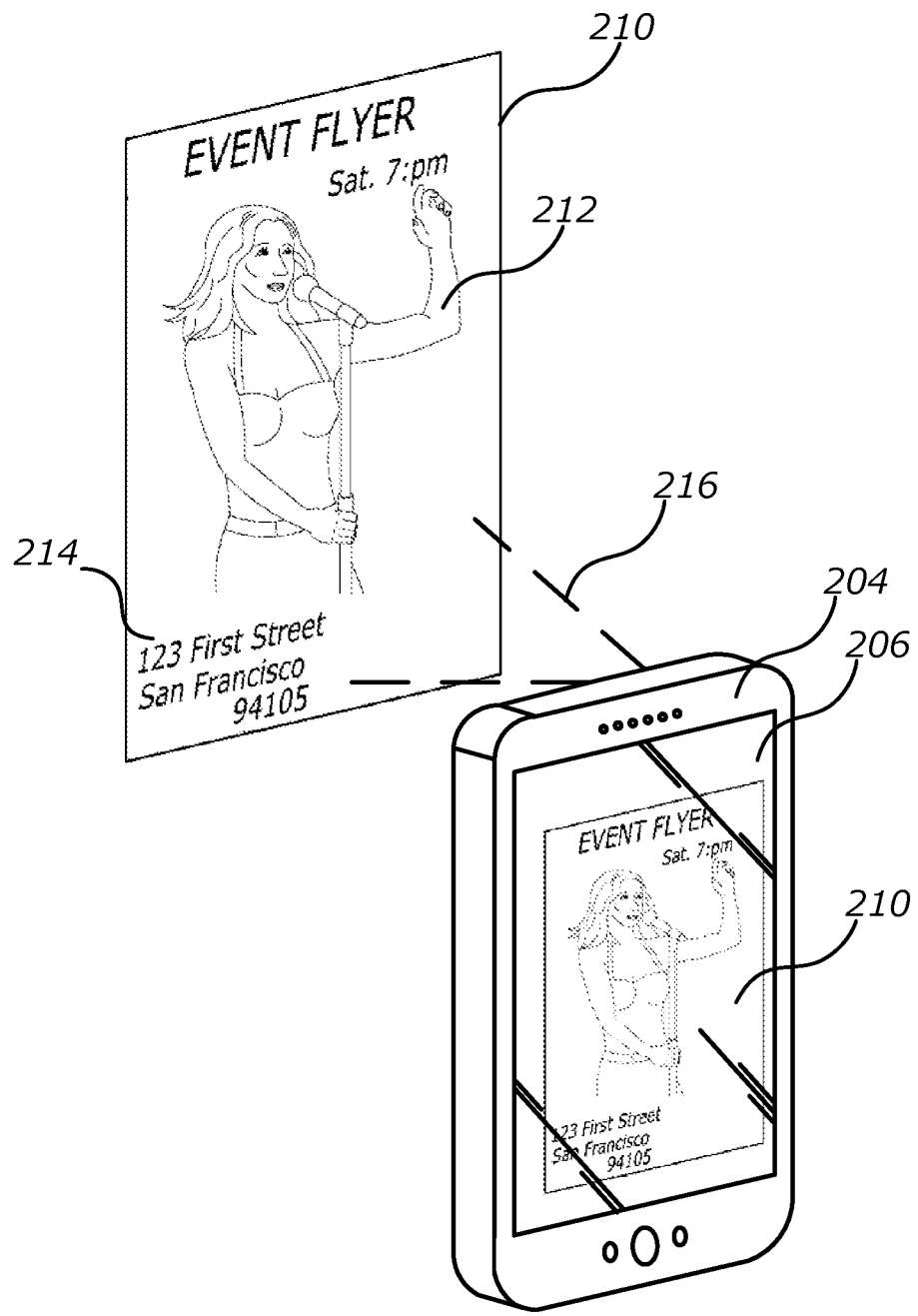
FIGS. 2A-2B illustrate an example implementation where a motion of a device causes a portion of an image to be adjusted based on an enabled image view control mode, in accordance with an embodiment.
Figure 2B:
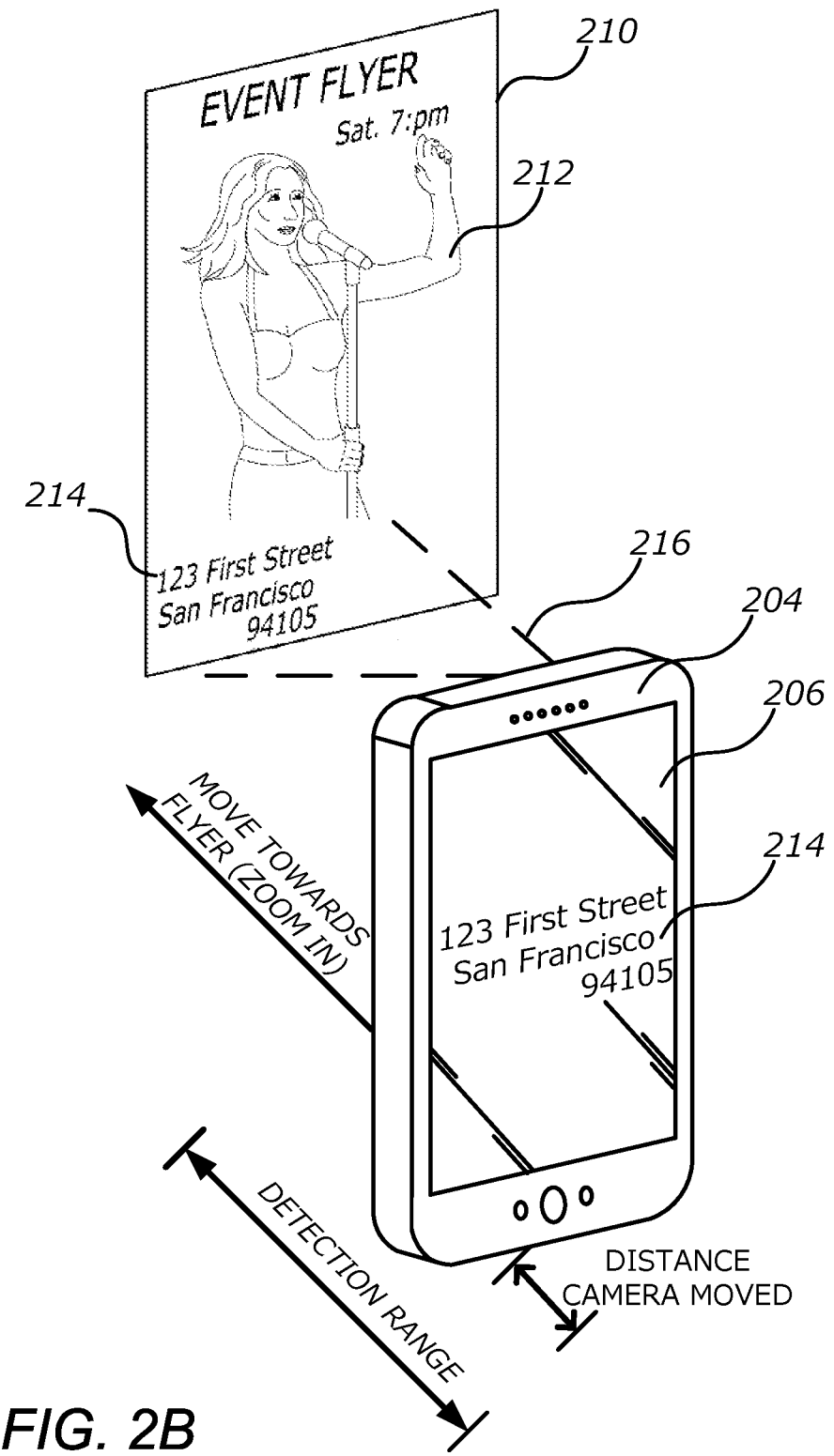

FIGS. 2A-2B illustrate an example implementation where a motion of a device causes a portion of an image to be adjusted based on an enabled image view control mode, in accordance with an embodiment. As shown in FIG. 2A, a computing device 204 (e.g., a mobile phone) is pointed at an event flyer 210. The computing device can include one or more cameras (front and/or rear-facing) and an interface 206 (or other display element) that displays an image captured in an active field of view 216 of the camera, in this case, the event flyer 210.

The event flyer 210 contains a graphic 212 of the event and an address 214 where the event is being held. The camera is positioned at a distance such that the entire event flyer can be displayed on the interface 206 of the device; however, in this example the user is seeking directions to the location of the event and would like to "zoom in" on the address located on the event flyer. In one instance, to "zoomed in" on the directions, the user can extend the phone out further (e.g., at full arm's length) to "zoom in" on the directions. However, this usually only works on objects that are close, i.e., within arm's reach or slightly farther, where moving the device over the normal span of reach (or some subset thereof) has a significant effect on object distance. In this cause, the object is a significant distance from the user, and the extra distance afforded by extending the user's arm at full arm's length may not provide an adequate "zoom" factor since the user may have only been able to extend their arm a few inches. Alternatively, the user can walk towards the event flyer to "zoom in" on the address. However, in some instances the user may not want to or cannot walk towards the object being captured by the camera.

In accordance with various embodiments, the user can invoke an image view control mode, such as a zoom control mode, to "zoom in" on the address 214 positioned on the event flyer 210. In this instance, moving the device towards the flyer can "zoom in" on the address and provide for an enlarged image, where in the conventional situation, moving the device towards the flyer at arm's length would have negligible effect displaying an enlarged image of the event flyer. For example, FIG. 2B illustrates the situation where after performing an activation movement to invoke the zoom control mode, the user can move the device relative to the user to cause the image displayed on the interface to zoom or otherwise adjust to display the address 214 of the event flyer 210.

As shown in FIG. 2B, the device 204 is moved in a forward motion relative to a user towards the event flyer 210, where the forward motion is performed within the detection range. As described above in FIG. 1, the detection range is a range of space or distance relative to the user in which the image view control mode is operable. The forward motion of the device causes the device to "zoom in" on the event flyer. For example, as shown in FIG. 2B, the interface is adjusted, in response to the motion of the device being detected, to "zoom in" on the address of the event flyer.

In accordance with an embodiment, other movements can be interpreted by the computing device to cause the device to adjust or otherwise modify a portion of the image being displayed on the interface. For example, in the instance where a user has "zoomed in" on an image, the user may want to move the image laterally (i.e., left, right, up or down) to display a different portion of the image on the interface. As described above, relatively small movements of the device, where the device moves in a small distance relative to the distance between the device and the object being captured, can cause the image displayed on the interface to adjust or otherwise move in what appears a greater distance.

Figure 3:
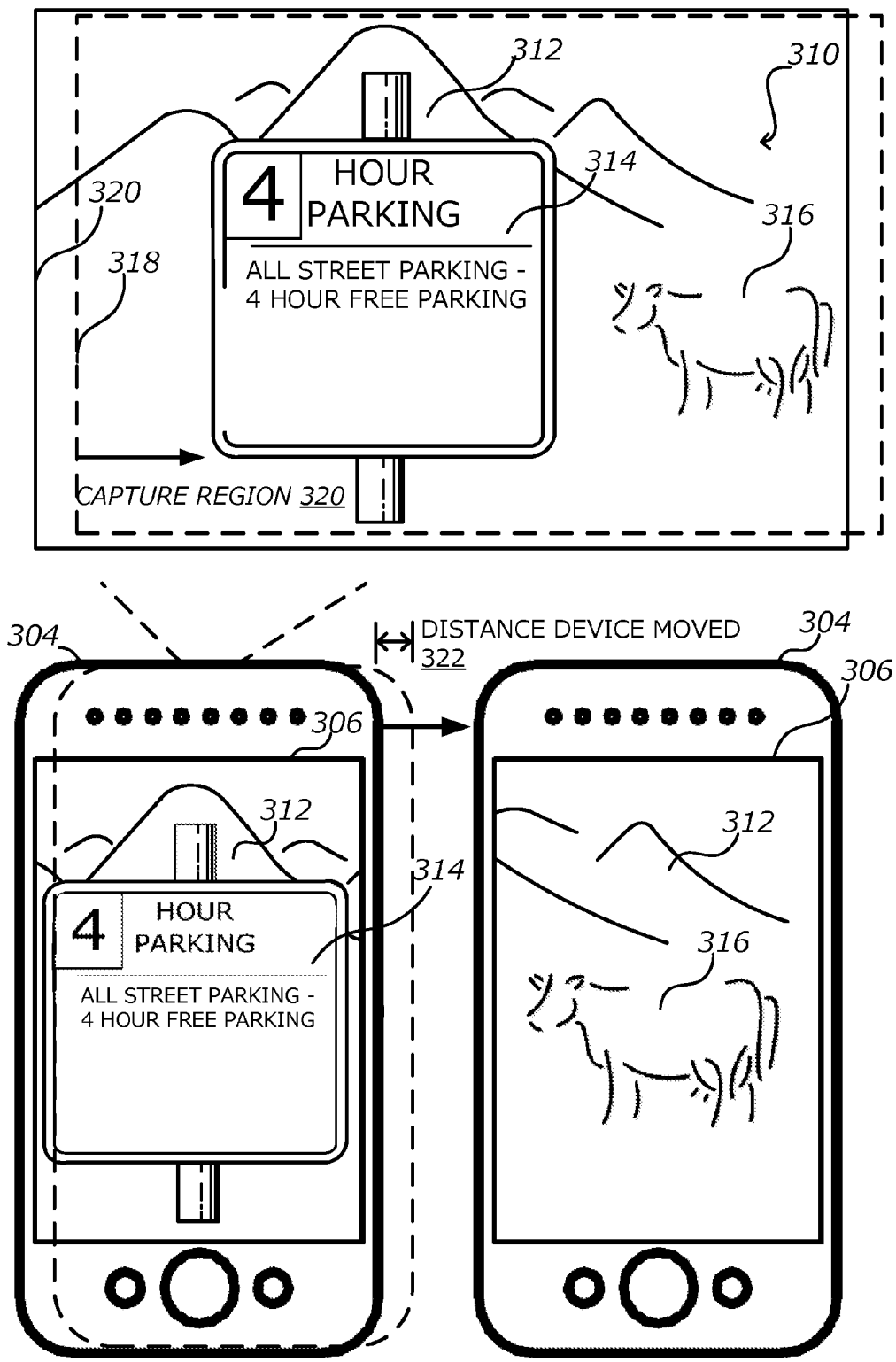
FIG. 3 illustrates an example implementation where a motion of a device causes a portion of an image to be adjusted based on an enabled image view control mode, in accordance with an alternative embodiment.

For example, FIG. 3 illustrates an example implementation where a portion of an image is being adjusted based on a lateral motion being performed, in accordance with an embodiment. As shown in FIG. 3, an interface 306 of a computing device 304 (e.g., a mobile phone) is displaying a scenic view 310 of the active field of view being captured by a camera of the device. The scenic view can include a mountainside 312, a parking sign 314, and an animal 316. In this example, a zoom control mode has been invoked, and the user has "zoomed in" on the parking sign 314 and mountain side 312 by, e.g., moving the device in a forward motion towards the scenic view 310 relative to the user operating the device.

However, in some instances, the user may want to display other portions of the scenic view 310, such as an image of the animal 316 (which is located to the right of the sign). The user could "zoom out" (e.g., by pulling the device towards the user) then "zoom in" on the animal 316 by moving the device towards the animal 316. Alternatively, in accordance with an embodiment, the user can, when "zoomed in" on the scenic view 312, move the device laterally with respect to the user (i.e., to the right) to pan or otherwise adjusted the image displayed on the interface to display a "zoomed in" image of the animal 316.

The distance the device moves 322 can be relatively small compared to the actual distance between the sign 314 and the animal 316. For example, as shown in FIG. 3, distance 322 may be an inch or two, while the distance between the sign and animal can be ten to fifteen feet. Accordingly, this advantageously allows a user to only have to move a device a small distance to capture a desired portion of the image.

Similarly, the portion of the image (or region) displayed by the active field of view of the device is moved a relatively small distance, compared to the actual distance between the sign and the animal, to display an adjusted image that includes the animal. For example, as shown in FIG. 3, the region captured by the active field of view of the device 320 includes the sign 314, the mountain side 312 and the animal 316. As described above, this region can be "zoomed in" to display only a portion of the captured image 320, e.g., the sign 314 and mountain side. When "zoomed in", the device can be moved laterally a distance 322 to display an adjusted image that includes the animal 316, while the new region captured by the active field of view of the device 318 still includes the sign 314, the mountain side 312, and the animal 316. Accordingly, this advantageously allows a user to only have to move a device a small distance to display a different view of an image captured in the active field of view of a camera. If the user were to "zoom out", the image displayed by the active field of view of the camera (as shown in the doted box 318) would be roughly the same image as shown in the sold box 320 before moving the device.

Figure 4:
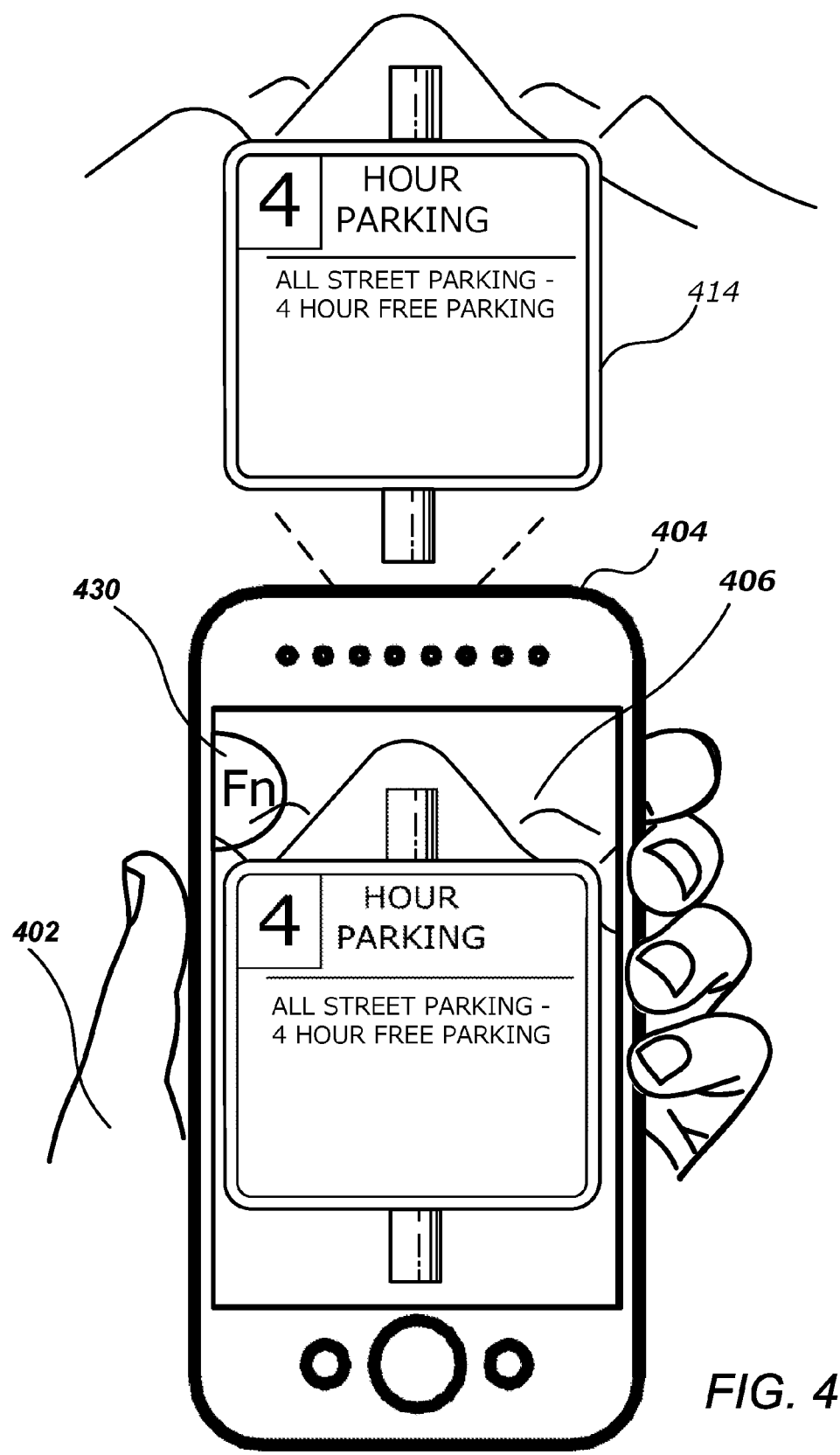
FIG. 4 illustrates an example implementation where a user is interacting with a graphical user interface (GUI) of a computing device to enable an image view control mode, in accordance with an embodiment.

FIG. 4 illustrates an example implementation where a user is interacting with a graphical user interface (GUI) of a computing device to enable an image view control mode, in accordance with an embodiment. In various embodiments, upon invoking an image view control mode, the user can use a thumb or finger of the hand holding the device to select or interact with one or more user-selectable elements, objects, or portions of the interface displayed on the screen of the device, such as by touching the screen at a location associated with one of the user-selectable elements for at least a determined period of time to activate or change the image view control mode. For example, each user-selectable element can enable an associated image view control mode when selected, and when one of the user-selectable elements is selected, movement of the device can cause the image view control mode associated with the selected user-selectable element to be performed at least during the time the user-selectable element is selected, while the device is moved, or for some other period of time or action. Additionally, selecting and releasing one of the user-selectable elements can enable the image view control mode associated with the selected user-selectable element. Thereafter, movement of the device can cause the image displayed on the device to adjust based on the enabled image view control mode. A subsequent selection of the same user-selectable element can disable the image view control associated with that user-selectable element.

Alternatively, selecting one of the user-selectable elements can toggle between different image view control modes. For example, as described above, an image view control modes can include one of such a zoom mode, a brightness mode, a contrast mode, or any other mode that can be used to manipulate, enhance or otherwise adjust the image, and selecting the user-selectable element can toggle between the different image view control modes.

As described above, when an image view control mode is enabled, such as a zoom control mode, the user can hold the device 404 in a hand 402, and can move the device relative to the user to cause the interface to zoom or otherwise adjust. However, approaches in accordance with various embodiments can utilize a dual- or multi-input approach that can provide a greater level of control and accuracy over an interface rendered on the device. In at least some embodiments, the device can enable a user to utilize motions in order to invoke and execute an image view control mode, such as a zoom image control mode, to zoom among other such actions. At the same time, the device can utilize a touch input to change the image view control mode performed by the motion or gesture. These approaches complement each other, and enable a user to adjust an image displayed on an interface.

For example, as shown in FIG. 4, a user is able to move the device in to zoom or otherwise update the display of the interface on the computing device. In this example, the device can be moved towards an object (e.g., a sign 414), which can cause the interface 406 rendered on the device to "zoom in" or cause that object to be expanded on the display screen of the device to display a second portion of the interface on the display screen. Similarly, the user can pull the device towards the user to "zoom out", among other such actions.

Accordingly, approaches in accordance with various embodiments can enable the user to interact with the interface 406 of the device 404 to toggle through and/or enable additional image view control modes that can be used to adjust a portion of the image displayed on the interface. For example, a user is able to use a thumb or other finger of the hand holding the computing device 404 to select a user-selectable element 430, object, or portion of the interface displayed on the computing device. The user can select the user-selectable element by contacting a corresponding location on a touch-sensitive display screen, for example, or in at least some embodiments can "hover" or hold the thumb for a period of time over that portion of the screen by contacting the screen, in order to select the user-selectable element. Such an approach can enable a user to move the device with one hand, while simultaneously making a selection, which can provide a greater level of control when adjusting the image displayed on the interface.

For example, user-selectable element 430 can be associated with an image view control mode, and selecting the user-selectable element can toggle on (i.e., enable) or switch between one of a plurality of image view control modes. As shown in FIG. 4, an interface 406 of the device 404 is displaying a sign 414 captured by a camera of the device, and a zoom control mode has been invoked allowing the user to cause the device to "zoom in" on the parking sign 414.

When a selection action or a touch input is received at the user-selectable element 430, the image view control mode can be changed to the control mode associated with the user-selectable element. For example, in the case where user-selectable element 430 is associated with a brightness control mode, and the user-selectable element is selected, the computing device can enable a user to utilize the brightness control mode to adjust the brightness of the image.

Additionally, repeated touch inputs to the same user-selectable element can be used to toggle between one or more control modes. For example, in accordance with an embodiment, selecting the user-selectable element 430 can toggle the image view control mode from a zoom control mode, to a brightness control mode, to a saturation zoom control mode, etc. Thereafter, when the image view control mode is selected, the user can move the device (e.g., in a forward and backward mode) to implement the control mode the user selected.

It should be noted that although one user-selectable element is shown in FIG. 4, more user-selectable elements that can change the image view control mode are possible. It should be further noted that the user-selectable elements do not have to be user-selectable elements, objects, or areas situated on a display screen that can receive and cause a computing device to perform a control mode. In accordance with various embodiments, one or more physical buttons can be placed on or around the computing device and can be used to change the control mode. In some embodiments, a graphical indication such as an arrow or other graphical representation can be used to indicate to a user the availability of the physical buttons, along with a graphical indication that can indicate the control associated with the physical button and/or the user-selectable elements positioned on the display screen. Additionally or alternatively, various alternative arrangements within the scope of the embodiments described herein can be used to change the image view control mode, as will be evident to one or ordinary skill in the art, such as shaking the device, holding the device in a certain orientation, receiving a voice activation input, etc.

Figure 5:
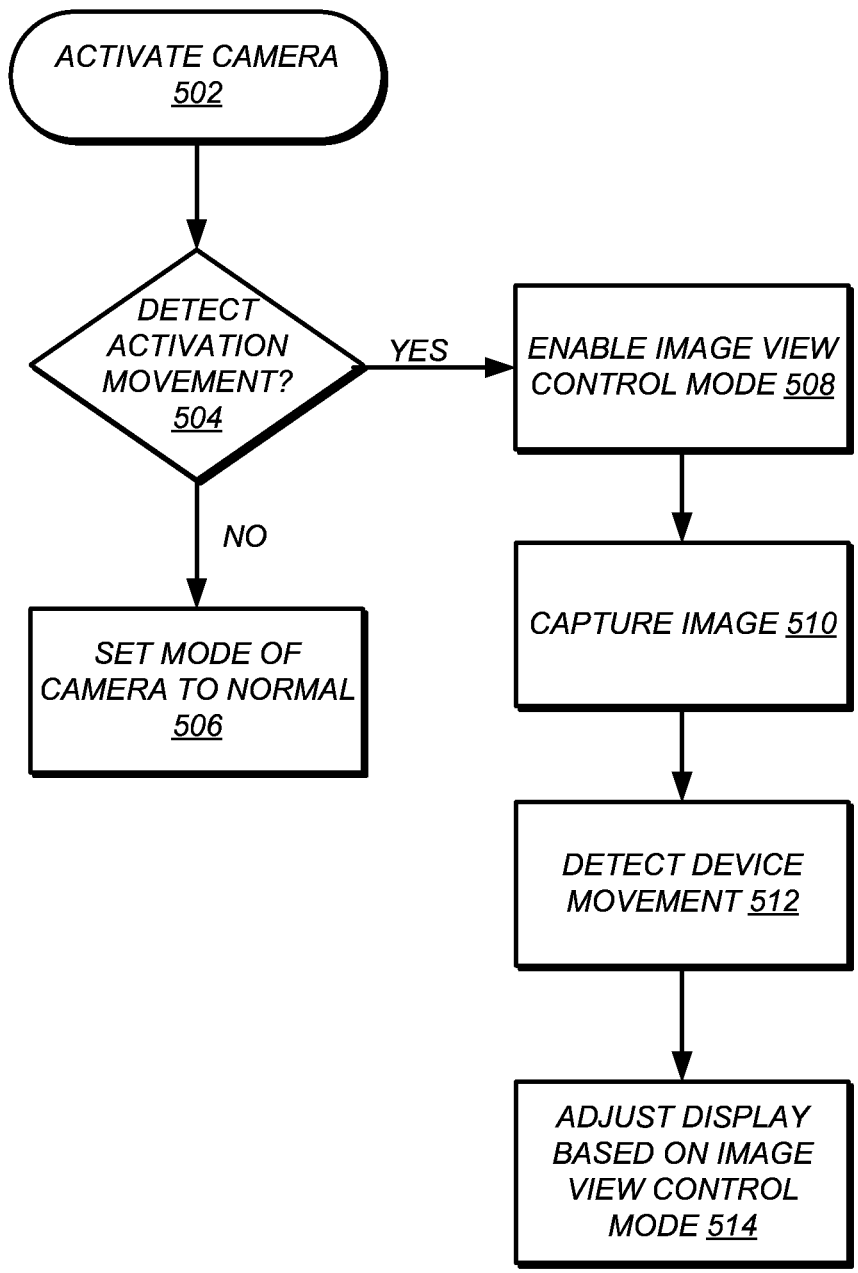
FIG. 5 illustrates an example process for managing an image view display, in accordance with various embodiment.

FIG. 5 illustrates an example process for managing an image view display, in accordance with various embodiments. It should be understood that, for any process described herein, that there can be additional or fewer steps performed in similar or alternative orders, or in parallel, within the scope of the various embodiments unless otherwise stated. At step 502, a camera on a computing device is activated. At step 504, it is determined whether an activation movement has been performed. For example, for a predefined time after activating the camera, such as one or two seconds, an activation movement can be detected by the device. As described above, the activation movement can be any movement, such as a forward and backward movement of the device.

If no activation movement is detected within the predefined time, then at step 506, the camera is set to a default picture taking mode. If an activation movement is detected within the predefined time, then at step 508, an image view control mode is enabled. As described above, an image view control mode can be any mode that is used to adjust or otherwise modify a portion of the image being displayed on the interface. Such modes can include, but are not limited to, a zoom mode, a brightness mode, a contrast mode, or any other image control mode that can be used to manipulate, enhance or otherwise adjust the image by moving the device relative to the user.

At step 510, an image is captured using at least one camera of the computing device. At step 512, movement of the device is detected. The movement can be any movement, such as a forward or a backward movement of the device relative to the user. At step 514, the image displayed on the device is adjusted based on the enabled image view control in response to detecting movement of the device. For example, in the situation where a zoom control mode is invoked, a forward movement of the device relative to a user holding the device can cause the image displayed on the device to be "zoomed in", while a backward movement of the device relative to the user can cause the image displayed on the device to be "zoomed out".

Figure 6:
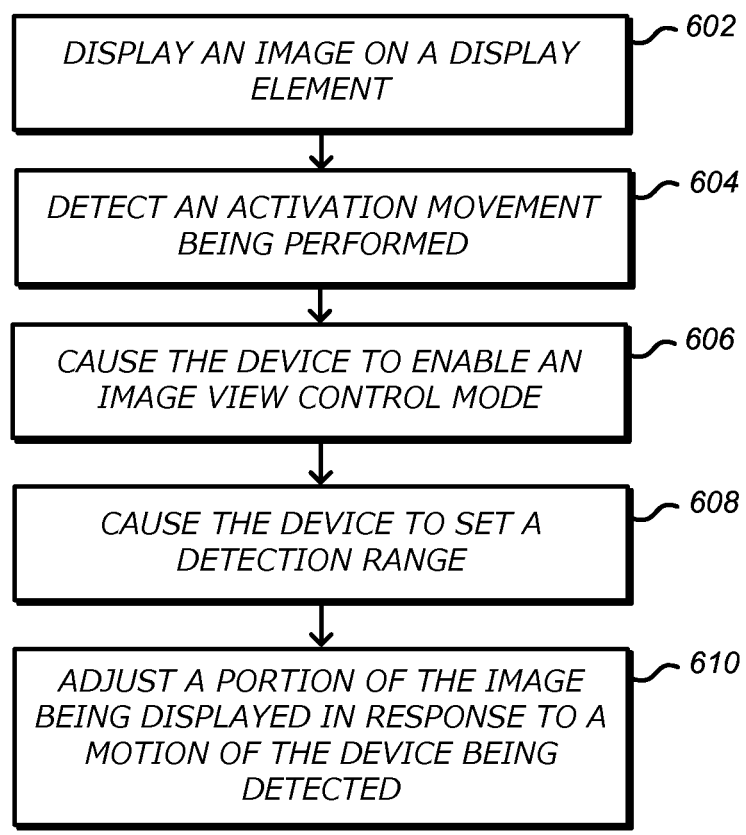
FIG. 6 illustrates an example process for managing an image view display, in accordance with various alternative embodiments.

FIG. 6 illustrates an example process for managing an image view display, in accordance with various alternative embodiments. At step 602, an image of an object is displayed on an interface or other display element of a computing device. The image can be captured using one or more camera or other sensor(s) of the computing device. At step 604, an activation movement, or other action or gesture being performed by the user is detected. The activation movement can be any movement, such as a forward and backward motion of the computing device relative to at least one position of the user. Additionally, the activation movement can be one of depressing a physical button on the computing device, shaking the computing device, and selecting a user-selectable element on a display element of the computing device.

Upon detecting the activation movement, a detection/distance range of the activation movement is mapped to a zoom range associated with the camera. The zoom range of the camera can depend on a number of characteristics of the computing device, such as screen resolution of the computing device and camera resolution.

In accordance with an embodiment, mapping the detection/distance range to the zoom range can include determining the zoom range based on the characteristics of the computing device and/or camera; determining the detection/distance range of the activation movement; and mapping the detection/distance range to the zoom range.

In various embodiments, determining the detection/distance range can include detecting, using at least one sensor of the computing device, at least one position of a user, and based on the at least one position of the user, detecting a start position of the forward motion relative to the user and a stop position of the forward motion relative to the user. Thereafter, the detection range can be established based at least in part on the start position and the stop position.

Alternatively, the detection/distance range can be set based on user characteristics, such as age. Further, the detection/distance range can be adaptive, where the computing device can learn or otherwise adjust the detection/distance range based on a user's motion used to activate the image view control mode. For example, the computing device can monitor the detection/distance range set by the user's activation movement, and can customize or modify the detection/distance range based on the monitoring of the user's activation movement.

In accordance with an embodiment, the detection/distance range can be associated with an adjustment range of the image view control, where the adjustment range can indicate a maximum and minimum amount of image adjustment possible based on the image view control. For example, in the instance where the image view control is a zoom view control, the adjustment range can be the maximum and minimum amount of magnification possible for the captured image, taking into account other factors such as screen resolution and camera resolution.

At step 606, the computing device enables an image view control mode and sets a detection/distance range based at least in part on the activation movement, where the detection/distance range can be an area or range around and/or near the user, and a movement of the device within the range can cause the device to adjust the displayed image by a corresponding amount, as may be determined based on the image view control mode. As described above, the image view control mode can be, e.g., a zoom control mode or other such mode that can be used to adjust or otherwise modify a portion of the image being displayed on the interface. In accordance with an embodiment, the computing device can also disable the image view control mode upon receiving an indication of a deactivation action, where the deactivation action can include in number of events or actions, such as taking a picture or closing/turning off the camera or application associated with the camera.

At step 608, in response to a motion (such as moving the device closer to the object) of the computing device being detected within the detection range, the device can adjust a zoom level of the image being displayed, an amount of the zoom level corresponding to an amount of the motion within the distance range as determined by the mapping. For example, the image being displayed can be adjusted to, e.g., display a "zoomed in" portion of the image, which can be accomplished using an optical zoom and/or digital zoom.

In accordance with an embodiment, the image displayed can further be adjusted while a "zoomed in" image is being displayed. For example, when a magnified or otherwise "zoomed in" image is being displayed, and the computing device receives an indication of a lateral motion, the computing device can cause the image displayed to be adjusted or moved laterally an amount corresponding to the amount of the lateral motion detected within the distance/detection range. Thereafter, the adjusted portion can be displayed on the computing device.

Figure 7:
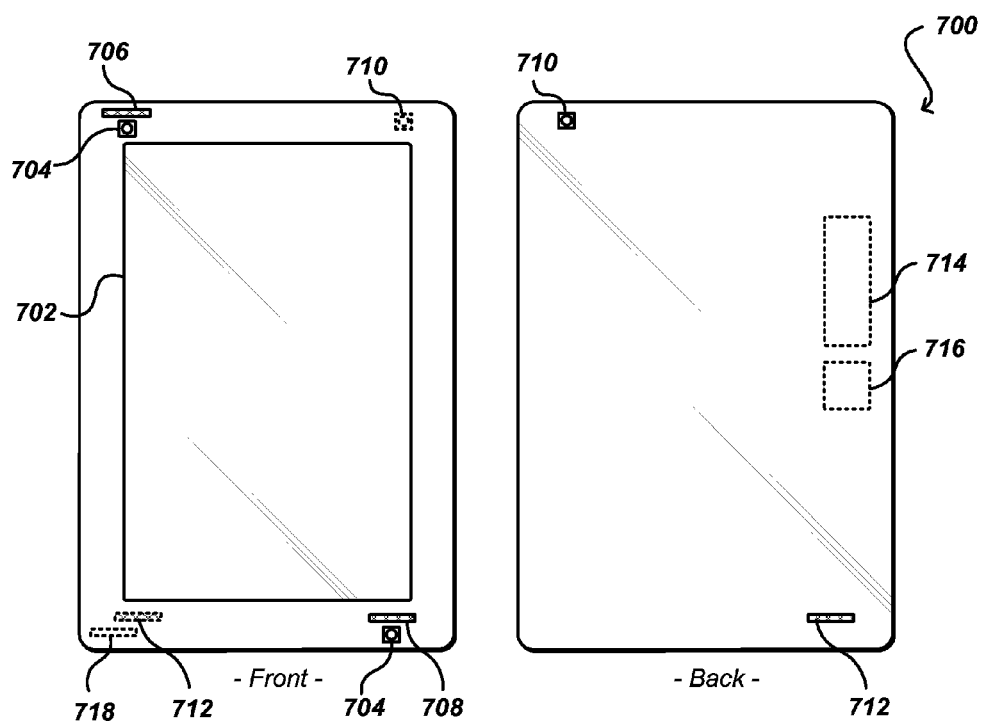
FIG. 7 illustrates front and back views of an example portable computing device that can be used in accordance with various embodiments.

FIG. 7 illustrates front and back views of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
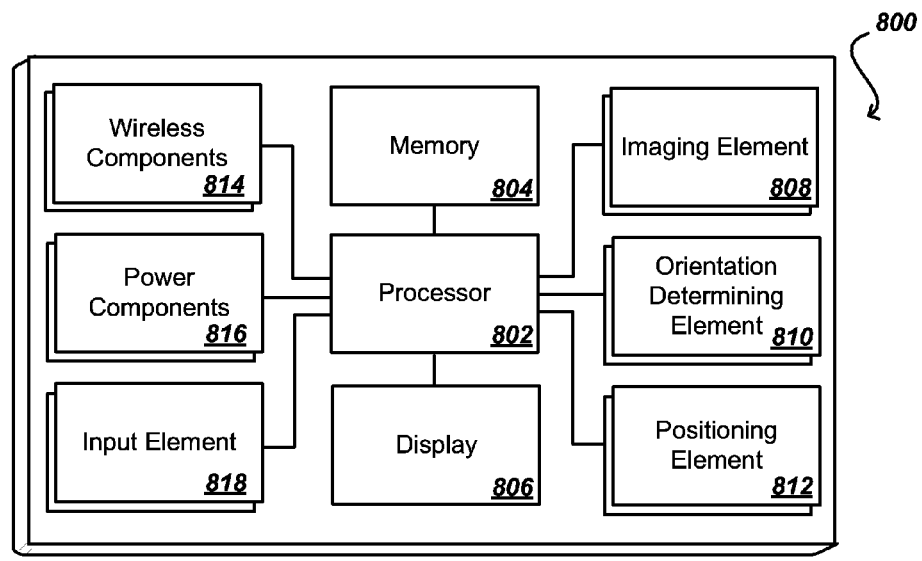
FIG. 8 illustrates an example set of basic components of a portable computing device, such as the device described with respect to FIG. 7.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
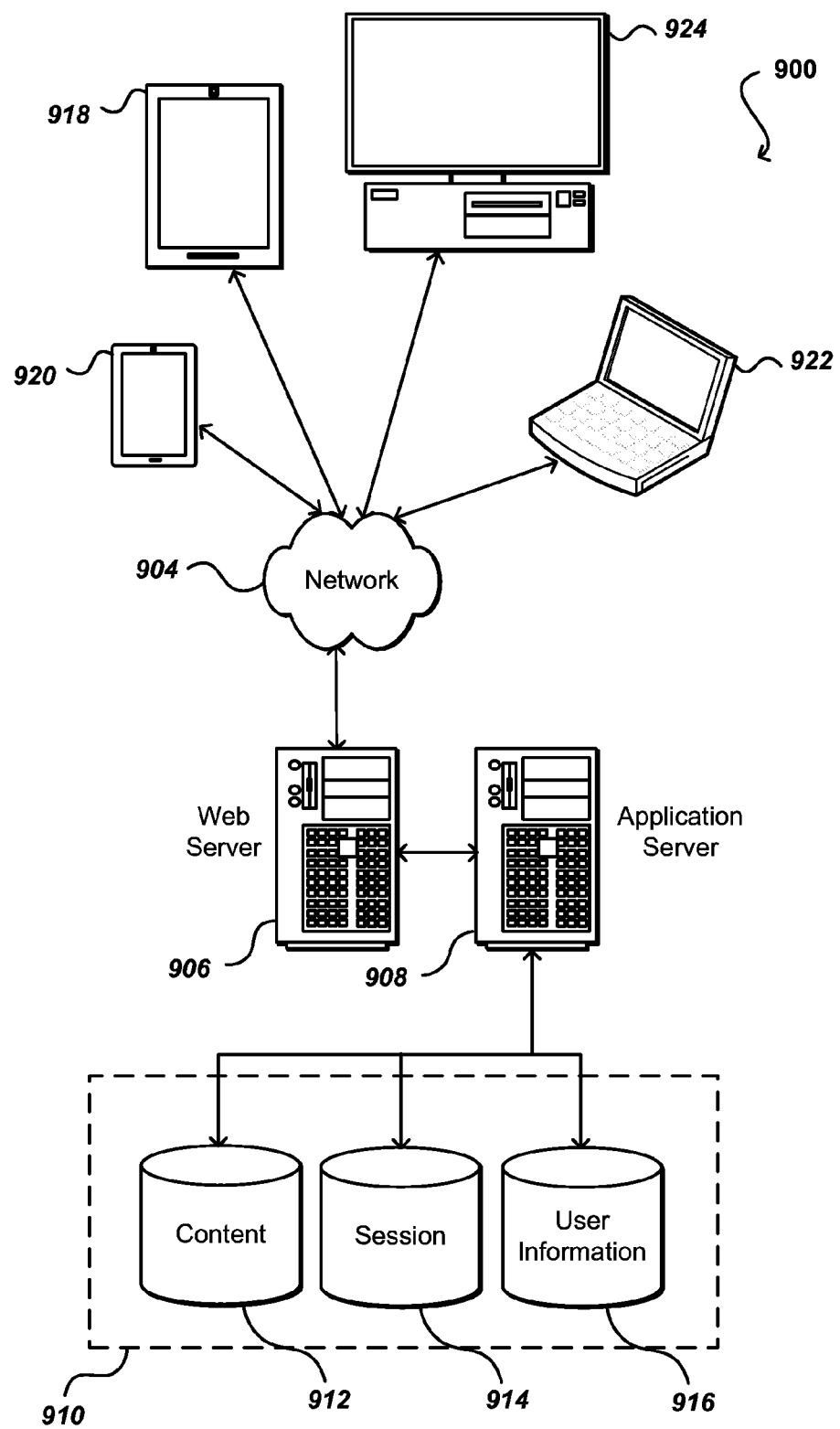
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes electronic client devices 918, 920, 922, and 924, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client devices 918, 920, 922, and 924 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 918, 920, 922 and 924. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for managing an image view display, the method comprising:
   under control of one or more computer systems configured with executable instructions,
   activating a first camera on a first side of a computing device;
   displaying a first image, captured by the first camera using a first zoom level within a zoom range, on a display element on a second opposing side of the computing device;
   detecting, using at least a pair of second cameras on the second opposing side of the computing device, a first movement of the computing device relative to a user of the computing device within a predefined period of time after the first camera is activated, the first movement including a forward motion from a first position to a second position and a backward motion from the second position to the first position;
   determining, using the first position and the second position, a range of movement for the computing device;
   generating a mapping of the range of movement to the zoom range;
   detecting a second movement of the computing device within the range of movement;

determining a second zoom level based at least in part on the mapping and the second movement within the range of movement; and displaying a second image, captured by the first camera using the second zoom level, on the display element.

2. The computer implemented method of claim 1, wherein determining the range of movement includes:

determining, based on a first distance between a facial feature of the user and the computing device at the first position, as a start position;

determining, based on a second distance between the facial feature and the computing device at the second position, as a stop position; and determining the range of movement based at least in part on the start position and the stop position.

3. The computer implemented method of claim 1, further comprising:

receiving an indication of a lateral movement of the computing device relative to the user of the computing device during a time the second image is displayed, the lateral movement being one of a left movement or a right movement of the computing device relative to the user; and displaying a third image, captured by the second camera at the second zoom level, on the display element, the third image including at least a portion of an object positioned in a direction, corresponding to the lateral movement, relative to the user.

4. A computer implemented method, comprising:

under control of one or more computer systems configured with executable instructions, detecting, using at least a pair of first cameras on a first side of a computing device, a first movement of the computing device relative to a user of the computing device, the first movement including a forward motion from a first position to a second position and a backward motion from the second position to the first position;

determining, using the first position and the second position, a range of movement for the computing device;

determining a zoom range based at least upon the range of movement;

detecting a second movement of the computing device relative to the user within the range of movement;

determining a zoom level within the zoom range based at least in part on the second movement within the range of movement; and configuring a second camera on a second opposing side of the computing device to use the zoom level.

5. The computer implemented method of claim 4, wherein determining the range of movement includes:

determining a first distance, between a facial feature of the user and the computing device at the first position, as a start position;

determining a second distance, between the facial feature and the computing device at the second position, as a stop position; and determining the range of movement based at least in part on the start position and the stop position.

6. The computer implemented method of claim 4, wherein the first movement corresponds to at least a particular pattern of movement of the computing device relative to the user of the computing device.

7. The computer implemented method of claim 4, further comprising:

activating the second camera based on detecting one of an indication of a depression of a button on the computing device, an indication of a shaking of the computing device, or an indication of a selection of a user-selectable element on a display element on the first side of the computing device;

detecting an indication of a deactivation action; and deactivating the second camera.

8. The computer implemented method of claim 4, wherein the forward motion and the backward motion are performed within a predefined period of time after the second camera is activated.

9. The computer implemented method of claim 4, further comprising:

displaying an image, captured using the second camera using the zoom level, on a display element on the first side of the computing device.

10. The computer implemented method of claim 4, further comprising:

configuring the second camera to use one of a selected saturation level, a selected contrast level, or a selected exposure level.

11. The computer implemented method of claim 4, further comprising:

detecting a depression of a button on the computing devices;

receiving an indication that the button is released; and capturing an image using the second camera at the zoom level.

12. The computer implemented method of claim 4, further comprising:

receiving an indication of a lateral movement during a time the second camera is using the zoom level, the lateral movement being one of a left movement or a right movement of the computing device relative to the user; and displaying an image, captured by the second camera using the zoom level, on a display element on the first side of the computing device, the image including a representation of at least a portion of an object positioned in a direction, corresponding to the lateral movement, relative to the user.

13. A computing system, comprising:

at least a pair of first cameras on a first side of the computing system;

a second camera on a second opposing side of the computing system;

a display element on the first side;

at least one processor; and memory including instructions that, when executed by the at least one processor, cause the computing system to:

display an image, captured by the second camera using a first zoom level, on the display element;

detect, using at least the pair of first cameras, a first movement of the computing system relative to a user of the computing system, the first movement including a forward motion from a first position to a second position and a backward motion from the second position to the first position;

determine, using the first position and the second position, a range of movement for the computing system;

determine a zoom range based at least in part on the range of movement;

detect a second movement within the range of movement;

determine a second zoom level within the zoom range based at least in part on the second movement within the range of movement; and configure the second camera to use the second zoom level.

14. The computing system of claim 13, wherein the instructions, when executed, further cause the computing system to:
   detect a lateral movement of the computing system relative to the user of the computing system during a time the second camera is using the second zoom level, the lateral movement being one of a left movement or a right movement of the computing system relative to the user; and
   display a second image, captured by the second camera using the second zoom level, on the display element, the second image including a representation of at least a portion of an object positioned in a direction, corresponding to the lateral movement, relative to the user.

15. The computing system of claim 13, wherein the instructions, when executed, to cause the computing system to determine the range of movement, include causing the computing system to:
   determine a first distance, between a facial feature of the user and the computing system at the first position, as a start position;
   determine a second distance, between the facial feature and the computing system at the second position, as a stop position; and
   determine the range of movement based at least in part on the start position and the stop position.

16. The computing system of claim 13, wherein the instructions, when executed, further cause the computing system to:
   activate the second camera based on detecting one of an indication of a depression of a button on the computing system, an indication of a shaking of the computing system, or an indication of a selection of a user-selectable element on the display element;
   detect an indication of a deactivation action; and
   deactivate the second camera.

17. The computing system of claim 13, wherein the forward motion and the backward motion are performed within a predefined period of time after the second camera is activated.

18. The computing system of claim 13, wherein the instructions, when executed, further cause the computing system to:
   display a second image, captured using the second camera at the second zoom level, on the display element.

19. The computing system of claim 13, wherein the instructions, when executed, further cause the computing system device to:
   detect a depression of a button on the computing system, receive an indication that the button is released; and
   capture a second image using the second camera at the second zoom level.

20. A non-transitory computer readable storage medium storing one or more sequences of instructions executable by one or more processors to cause the one or more processors to:
   detect, using at least a pair of first cameras on a first side of a computing device, a first movement of the computing device relative to a user of the computing device, the first movement including a forward motion from a first position to a second position and a backward motion from the second position to the first position;
   determine, using the first position and the second position, a range of movement for the computing device;
   determine a zoom range corresponding to the range of movement;
   detect a second movement of the computing device relative to the user within the range of movement;
   determine a zoom level within the zoom range based at least in part on the second movement within the range of movement; and
   configure a second camera of the computing device to use the zoom level.

21. The non-transitory computer readable storage medium of claim 20, wherein the instructions, when executed, to cause the one or more processors to determine the range of movement include causing the one or more processors to:
   determine a first distance, between a facial feature of the user and the computing device at the first position, as a start position;
   determine a second distance, between the facial feature and the computing device at the second position, as a stop position; and
   determine the range of movement based at least in part on the start position and the stop position.

22. The non-transitory computer readable storage medium of claim 20, wherein the first movement corresponds to at least a particular pattern of movement of the computing device relative to a user of the computing device.

23. The non-transitory computer readable storage medium of claim 20, wherein the instructions, when executed, further cause the one or more processors to;
   activate the second camera based on detecting one of an indication of a depression of a button on the computing device, an indication of a shaking of the computing device, or an indication of a selection of a user-selectable element on a display element on a first side of the computing device;
   detect an indication of a deactivation action; and
   deactivate the second camera.

24. The non-transitory computer readable storage medium of claim 20, wherein the forward motion and the backward motion are performed within a predefined period of time after the second camera is activated.

* * * * *